Sept. 25, 1928.  
E. C. SPARLING  
1,685,762
LATITUDE INDICATOR
Filed June 27, 1925
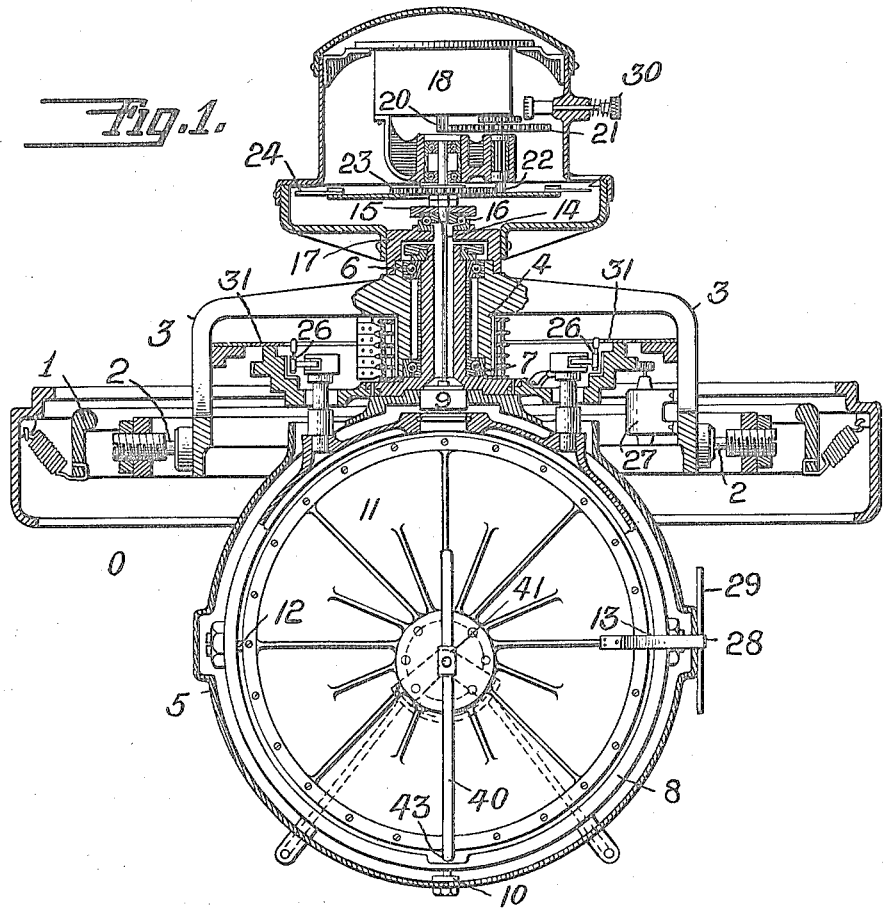
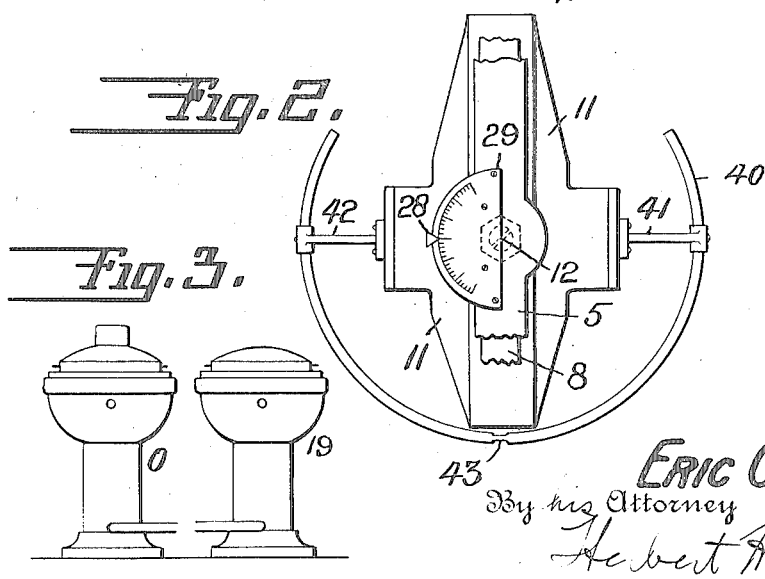
Inventor  
Eric C. Sparling,  
By his Attorney  
Herbert H. Thompson Patented Sept. 25, 1928.

1,685,762

UNITED STATES PATENT OFFICE.

ERIC C. SPARLING, OF BROOKLYN, NEW YORK, ASSIGNOR TO THE SPERRY GYROSCOPE COMPANY, OF BROOKLYN, NEW YORK, A CORPORATION OF NEW YORK.

LATITUDE INDICATOR.

Application filed June 27, 1925. Serial No. 39,926.

This invention relates to gyroscopic devices designed especially to indicate the latitude of the place in which the device is located. I am aware that instruments for this purpose have been heretofore proposed in which the principle of gyroscopic fixity in space was employed as the underlying feature of operation. Because they depend upon their initial setting and have no directive or latitude seeking power, such devices have never proved successful.

My invention, on the other hand, is distinguished from instruments of this class in that I employ means to apply a positive torque on the gyroscope on its deviation from a fixed plane, say the plane of the meridian and thereby give the instrument positive directive power. Said torque is applied preferably about the vertical axis of the apparatus thereby causing precession about the horizontal axis. The device is, therefore, also distinguished from the gyro compass in which gravitational means are employed for applying a torque about the horizontal axis of the device whenever the same becomes inclined due to departure from the meridian. Since the only position of a gyroscope, with three degrees of freedom on the earth's surface, in which apparent movement does not take place, is when the axis of the gyroscope is parallel to the axis of the earth, it follows that a gyroscope made according to my invention will assume a position in which the axis is in the plane of the meridian and is inclined to the earth's surface at an angle equal to the latitude of that point. By employing an indicator to indicate the tilt of the gyro axis, the latitude is thus indicated directly.

Referring to the drawings in which what I now consider the preferred form of my invention is shown, Fig. 1 is a south elevation, partly in section, of my latitude indicator, the cover and stand not being shown.

Fig. 2 is an east elevation of the sensitive element of the apparatus, parts being broken away.

Fig. 3 shows diagrammatically my indicator as connected to a standard gyroscopic compass for operation therefrom.

For illustrating my invention, I have shown a form of gyroscope 0 similar to the standard Sperry gyroscopic compass. The gyroscope is shown as supported within gimbal ring 1 on trunnions 2. The framework 3 is provided with a central boss 4 within which the vertical guide bearings are provided. The outermost revolvable frame may be a follow-up support 5 journaled within the boss 4 on guide bearings 6 and 7. Within the follow-up frame is a vertical ring 8 guided at upper and lower guide bearings 9 and 10. Within the vertical ring is supported the gyro casing 11 on horizontal trunnions 12 and 13, the gyroscope being, in this instance, supported in neutral equilibrium, that is, substantially balanced about the axis 12—13. Also, instead of suspending the vertical ring from the follow-up frame, the torsion wires 14 are in this instance supported on a rotatable head 15, which may be journaled by thrust bearing 16 on fixed portion 17.

Through said torsion element 14 I prefer to impart a torque which is brought into action on departure of the gyroscope from the plane of the meridian, said torque acting on the gyroscope through the vertical ring 8 and hence acting about the vertical axis only. To impart such a torque I have shown a compass controlled means, such as a repeater motor 18, which is designed to be operated from a standard gyro compass 19 (see Fig. 3) in the usual manner. Said repeater motor 18 is shown as connected to the torsion head 15 through a pinion 20 on the shaft of the repeater motor meshing with a large gear 21 having on the shaft thereof a second pinion 22. Said pinion meshes with a larger gear 23 on the shaft of the torsion head 15, so that said head is kept in the same position in azimuth. If desired, a compass card 24 may be secured to the gear 23 or torsion head 15. The device may be synchronized with the compass by means of a hand-synchronizing handle 30. The card 24 may be provided in addition to the usual card 31 to aid in setting the device with zero twist in the suspension. The follow-up system may be driven in the usual manner from the vertical ring by means of reversing contacts 26 controlling the reversible motor 27. It will be understood of course, that means other than a follow up support may be used, if desired, for reducing friction about the vertical, as my damping system is independent of the follow up system.

For indicating the latitude, I have shown a pointer 28 secured to the gyro case and co-operating with a scale 29 on the follow-up ring or vertical ring. Said scale may indicate either north latitude or south latitude depending upon whether the pointer shows a positive or negative angle on the scale.

For damping my latitude indicator I prefer to use a means for abstracting energy from the system which operates only when there is motion in the system and which does not disturb the equilibrium of the gyroscope about its horizontal axis. For this purpose I have shown a tube 40 bent preferably in substantially circular shape and supported on the gyro case 11 as by means of brackets 41 and 42, so that the tube is symmetrical about the horizontal axis 12—13 of the gyroscope. The tube preferably covers more than 180° of arc to provide for the fact that the gyroscope is designed to be inclined at various angles dependent upon the latitude. At some point in the tube, preferably at the bottom thereof, I provide a restriction 43 to retard the flow of liquid and thereby abstract energy from the same. The tube is partially filled with a liquid such as oil or mercury.

It will be evident that the flow of the liquid through the restricted passage upon changing inclinations of the gyroscope will abstract energy from the system thereby damping the gyroscope. Also by making the tube of uniform bore throughout (except for the restriction at one point, which is of negligible length) the balance of the gyroscope about its horizontal axis is not altered for different inclinations thereof as would be the case if cups or bottles were provided at the two ends of the tube, as has heretofore been the practice in liquid damping systems for gyroscopes.

In operation my device will execute a cycle of operations analogous to those executed by the gyro compass in seeking the meridian, the path traced by the end of the axle being an eclipse. Assuming my device, for instance, to be started up in a position in which the axis is on the meridian but not inclined at the proper angle for the latitude in which it is placed, the device will start to move off the meridian, the rotation of the earth "leaving it behind". This will cause a torque to be applied by the repeater motor 18 through the suspension 14 to cause precession of the gyroscope about its horizontal axis toward the position in which it is parallel to the earth's axis in both the horizontal and vertical planes. The instrument may, of course, swing slightly past this position until it comes to rest in a damped oscillation due to the abstraction of energy by the damping means. It will finally, however, come to rest with its axis exactly parallel to the earth's axis in all planes, since that is the only position in which the earth's rotation will not cause it to leave the meridian. The instrument, therefore, will give an accurate and continuous indication of the latitude. Its accuracy is also independent of its original setting, since it seeks its proper degree of tilt automatically, or in other words, it has positive directive power.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A latitude indicator, comprising a gyroscope, means for mounting the same in neutral equilibrium for oscillation about a horizontal axis and for turning about a vertical axis, a repeater compass, and yielding means supporting said gyroscope from said repeater compass for applying a torque about the vertical axis of the gyroscope.

2. In a latitude indicator, a gyroscope, means including a torsion suspension for mounting the same with three degrees of freedom, a scale showing the tilt of the gyroscope, and means for imparting directive power thereto comprising a repeater compass controlled from a gyroscopic compass and supporting said gyroscope through said torsion suspension.

3. A latitude indicator comprising a gyroscope mounted with freedom of movement about the vertical and horizontal axes, means controlled from a gyro compass for applying a torque thereon about its vertical axis upon deviation thereof from the meridian, and damping means independent of said gyro compass and acting about the horizontal axis of the gyroscope.

4. A latitude indicator, comprising a gyroscope, means for mounting the same in neutral equilibrium for oscillation about a horizontal axis and for turning about a vertical axis, compass-controlled means for maintaining the spin axis of said gyroscope substantially in the plane of the meridian, and a tube secured to said gyroscope adapted to contain a liquid and having a restriction at one point therein for damping the oscillations of the gyroscope.

5. In gyroscopic navigational apparatus, the combination with the gyroscope supported for oscillation about the horizontal axis, of damping means therefor comprising a tube bent in the form of an arc of a circle and having a restriction therein, means for securing said tube on the gyroscope so that it lies in a vertical plane and is symmetrically placed about the axis of oscillation thereof, and a liquid within said tube.

In testimony whereof I have affixed my signature.

ERIC C. SPARLING.